US012452918B1

(12) United States Patent
Yi

(10) Patent No.: US 12,452,918 B1
(45) Date of Patent: Oct. 21, 2025

(54) SYSTEMS AND METHODS FOR CHANNEL OCCUPANCY TIME SHARING AND SUBCHANNEL INTERLACING

(71) Applicant: CABLE TELEVISION LABORATORIES, INC., Louisville, CO (US)

(72) Inventor: Yunjung Yi, Vienna, VA (US)

(73) Assignee: Cable Television Laboratories, Inc., Louisville, CO (US)

(*) Notice: Subject to any disclaimer, the term of this patent is extended or adjusted under 35 U.S.C. 154(b) by 373 days.

(21) Appl. No.: 18/136,790

(22) Filed: Apr. 19, 2023

Related U.S. Application Data

(60) Provisional application No. 63/332,482, filed on Apr. 19, 2022, provisional application No. 63/332,514, filed on Apr. 19, 2022.

(51) Int. Cl.
*H04W 74/0808* (2024.01)
*H04W 72/25* (2023.01)

(52) U.S. Cl.
CPC ....... *H04W 74/0808* (2013.01); *H04W 72/25* (2023.01)

(58) Field of Classification Search
CPC .......... H04L 5/0094; H04W 16/14; H04W 72/0446; H04W 72/0453; H04W 72/25; H04W 72/56; H04W 74/002; H04W 74/0808
See application file for complete search history.

(56) References Cited

U.S. PATENT DOCUMENTS

2023/0064680 A1* 3/2023 Huang ................ H04L 27/2607

* cited by examiner

*Primary Examiner* — Thomas R Cairns
(74) *Attorney, Agent, or Firm* — Josh C. Snider; Snider IP

(57) ABSTRACT

A method is provided for initiating a sidelink operation between a first wireless device and a second wireless device in an unlicensed spectrum. The method includes steps of (a) receiving, at the first wireless device, first configuration parameters of a sidelink bandwidth part (BWP) for the sidelink operation, including a channel occupancy time (COT) signal for a COT sharing, (b) obtaining, after the step of receiving, second configuration parameters for a transmission sidelink resource pool, including at least one priority value for the COT sharing, (c) determining (i) a sidelink transmission of the sidelink operation from the first configuration parameters, and (ii) a priority level of the sidelink transmission from the second configuration parameters, (d) decoding a sidelink control information (SCI) to indicate an offset value and a COT duration for the COT sharing, and (e) transmitting the sidelink transmission and the SCI to the second wireless device.

20 Claims, 10 Drawing Sheets

SYSTEMS AND METHODS FOR CHANNEL OCCUPANCY TIME SHARING AND SUBCHANNEL INTERLACING

CROSS REFERENCE TO RELATED APPLICATIONS

This application claims the benefit of and priority to U.S. Provisional Application No. 63/332,482, filed Apr. 19, 2022, and to U.S. Provisional Application No. 63/332,514, filed Apr. 19, 2022, both of which are hereby incorporated by reference in their entireties.

BACKGROUND

The field of the invention relates generally to electronic device communication, and more specifically, to systems and methods for improved utilization of channels and subchannels used for digital communication for and between wireless electronic devices.

The Third Generation Partnership Project (3GPP) sets standards for mobile and cellular telecommunications technologies, including radio access, core network, and service capabilities. These standards are defined in numerous 3GPP Technical Specifications (TSs) (and/or Technical Reports (TRs)), and also further described in 3GPP TS Group Radio Access Network (TSG RAN) Work Items (WIs) (e.g., TSG RAN Working Group 4 (WG4), or RAN4), which provide national and international standards for digital, radio, and non-radio access for 3GPP-based networks and the communication devices operating therewith and therein, as well as standards for interworking with non-3GPP communication networks. 3GPP technologies continue to evolve to include generations and systems beyond 3G, including Fifth Generation (5G), Sixth Generation (6G), and Long Term Evolution (LTE) networks and communications. The 3GPP includes, among a number of organizational partners, the European Telecommunications Standards Institute (ETSI).

Conventional Channel Occupancy Time (COT) Sharing Approaches

3GPP TS 37.213 v16.5.0 (Release 16, April 2021) defines, among other things, standards for communication channel access procedures, shared occupancy within such communication channels, and channel occupancy time (COT) techniques for such shared occupancy. Conventionally, COT sharing by a wireless device is typically limited to a configured grant configuration of a sidelink operation of a shared channel. Standards for sidelink shared channels are defined, for example, in 3GPP TS 38.212 v16.8.0 (Release 16, January 2021). The relevant subject matter of this 3GPP paper, as well as the other 3GPP references discussed herein, are incorporated herein by reference. It is conventionally understood that a COT may be shared by one or more wireless devices for transmissions targeted for the wireless device. One example of a conventional COT sharing approach is described further below with respect to FIG. 1.

FIG. 1 is a schematic illustration of a conventional wireless communication system 100 implementing COT sharing. System 100 includes a first wireless communication device 102 (a user equipment device (UE), in this example), which may be within an operational range 104 of a communication node 106 (e.g., an eNB, gNB, base station, access point (AP), Wi-Fi AP, etc.). Communication node 106 may, for example, be directly or indirectly connected with a network 108 (e.g., an access network or a mobile network). In operation, first wireless communication device 102 is configured to provide COT information 110 with one or more respective second wireless communication devices 112 to enable second wireless communication devices 112 to communicate sidelink transmission signals 114 with respective third wireless communication devices 116 within range of that second wireless communication device 112. In some embodiments, one or more of first, second, and third wireless communication devices 102, 112, 116 may have installed therein (i.e., in a memory thereof for execution by a device processor (not shown in FIG. 1)), an application configured to implement one or more of the relevant processing steps required to execute sidelink operation among and between the respective devices.

One or more of second and third wireless communication devices 112, 116 may be outside of the operational range of communication node 106, and/or communication node 106 may be considered a hidden node. In one conventional approach, a COT sharing indicator is included in COT information 110 to mitigate hidden node negative effects. COT sharing indication is further defined in Section 4.1.3 of 3GPP TS 37.213. Conventional COT sharing techniques, however, experience limitations in the case where the sidelink operation is not configured with the specific grant configuration information needed for sidelink communication (e.g., described in Section 6.3.5 of 3GPP TS 38.331 v16.7.0 (December 2021)).

Another limitation of conventional COT sharing arises in the case where a wireless device decodes only first-stage sidelink control information (SCI), or SCI 1, that does not include an identifier of the transmitting device. One conventional approach utilizes second-stage SCIs (SCI 2), but does not utilize the SCI 2 to identify the transmitter, and instead requires a separate COT sharing ID for transmitter identification. Accordingly, there is a desire in the field to enhance and/or modify conventional COT sharing techniques for sidelink operation.

Conventional Sidelink Operation

FIG. 2 is a graphical illustration depicting a resource allocation configuration 200 for a sidelink shared channel. Configuration 200 distributes, over a number of time slots 202, a plurality of respective frequency channel sidelink slots 204. Each frequency channel sidelink slots 204 includes a number (i.e., 1-N) of subchannels 206, where each subchannel 206 is allocated a number (i.e., 1-M) of resource blocks (RBs)/physical RBs (PRBs) 208. That is, resource allocation of a sidelink shared channel is based on subchannel 206 containing a number (1-M) of consecutive RBs/PRBs 208 to reduce resource allocation overhead and resolution overhead among multiple wireless devices. Standards for physical resources are further defined, for example, in 3GPP TS 38.211 v15.10.0 (Release 16, December 2021), which is incorporated by reference herein.

In conventional implementations of configuration 200, a sidelink bandwidth-part (BWP) 210 configures one or more sidelink resource pools 212. Thus, a particular sidelink resource pool 212 would be confined within the configuring sidelink BWP 210. Each sidelink resource pool 212 therefore includes one or more of subchannels 202, each such subchannel 202 therefore containing multiple consecutive PRBs 208.

In some scenarios of configuration 200, a minimal resource granularity value for sidelink data transmission may be a single subchannel 206 of a sidelink slot 204, and resource sensing, selection, and reservation may occur in one or more of subchannels 206. To spread a sidelink transmission over more than a desired percentage of the entire bandwidth of a particular resource pool 212, or even over the entire spectrum of sidelink BWP 210, a conventional wireless device typically must schedule multiple subchannels 206 of each sidelink slot 204, thereby requiring utilization of an excessive number of RBs/PRBs 208 for each such sidelink data transmission. Such RB increases, however, will in turn negatively increase traffic congestion, as well as the collision probability. Accordingly, there is also a desire in the field for improved sidelink resource allocation techniques, particularly with respect to the unlicensed spectrum, and consistently with present regulatory requirements.

SUMMARY

In an embodiment, a method is provided for initiating a sidelink operation between a first wireless electronic device and a second wireless electronic device in an unlicensed spectrum. The method includes a step of receiving, at the first wireless device, one or more first configuration parameters of a sidelink bandwidth part (BWP) for the sidelink operation. The one or more first configuration parameters include at least one channel occupancy time (COT) signal for a first COT sharing. The method further includes a step of obtaining, after the step of receiving, one or more second configuration parameters for a transmission sidelink resource pool. The one or more second configuration parameters include at least one priority value for the first COT sharing. The method further includes a step of determining (i) a first sidelink transmission of the sidelink operation from the one or more first configuration parameters, and (ii) a first priority level of the first sidelink transmission from the one or more second configuration parameters. The method further includes steps of decoding a first sidelink control information (SCI) to indicate an offset value and a first COT duration for the first COT sharing, and transmitting the first sidelink transmission and the first SCI to the second wireless electronic device.

In an embodiment, a method is provided for sharing a channel occupancy time (COT) between a first wireless electronic device and a second wireless electronic device. The method includes a step of receiving, by the first wireless electronic device from the second wireless electronic device at a first time, a first sidelink control information (SCI) including (i) a first COT sharing, and (ii) a first priority value of a channel access. The method further includes a step of determining (i) a second priority value of the channel access for a sidelink transmission, and (ii) at least one sidelink resource for a sidelink transmission. The method further includes a step of calculating a first channel access type based on the first COT sharing, the first time, the first priority value, and the second priority value. The method further includes step of executing the first channel access type, and transmitting the sidelink transmission and the first SCI based on a successful execution of the first channel access type.

In an embodiment, a method is provided for selecting a listen-before-talk (LBT) category for a wireless electronic device. The method includes a step of receiving, by the wireless electronic device, (i) a first sidelink control information (SCI) indicating a sharing of channel occupancy time (COT) having a first time domain resource, and (ii) a second SCI indicating a sidelink feedback mode and a destination identity. The method further includes a step of determining, from the second SCI (i) a receiving sidelink shared channel scheduled by the second SCI, and (ii) a sidelink feedback scheduling based on the sidelink feedback mode. The method further includes a step of selecting at least one of a first LBT type and a second LBT type based on (i) the sidelink feedback scheduling, (ii) the sharing of the COT, (iii) a second time domain resource overlapping with the first time domain resource of the COT, and (iv) a feedback resource for a sidelink feedback of the sidelink feedback mode. The method further includes a step of transmitting the sidelink feedback based on the selected LBT type.

In an embodiment, a method is provided for configuring, by a wireless electronic device, one or more subchannels of a communication channel for interlacing. The method includes steps of receiving, by the wireless electronic device, configuration parameters of a sidelink operation in an unlicensed spectrum. The configuration parameters include (i) a starting frequency point of a common resource block (RB) determined to have a lowest index among one or more RBs of a first subchannel of the one or more subchannels, (ii) an enabling interlaced transmission parameter configured to enable determination of a resource for a sidelink transmission based on one or more interlace RBs, (iii) a starting RB index of the first subchannel determined to have a lowest RB index within a resource pool, (iv) a size of the first subchannel within the resource pool, and (v) a number of subchannels within the resource pool. The method further includes a step of determining a first set of RBs for the first subchannel based on (i) the enabling interlaced transmission parameter, (ii) the starting frequency point, and (iii) the size of the first subchannel. The method further includes a step of transmitting a sidelink transmission using resources based on the determined first set of RBs for the first subchannel, wherein the sidelink transmission includes a sidelink control information (SCI) indicating the first subchannel.

BRIEF DESCRIPTION

These and other features, aspects, and advantages of the present disclosure will become better understood when the following detailed description is read with reference to the following accompanying drawings, in which like characters represent like parts throughout the drawings.

Figure 1:
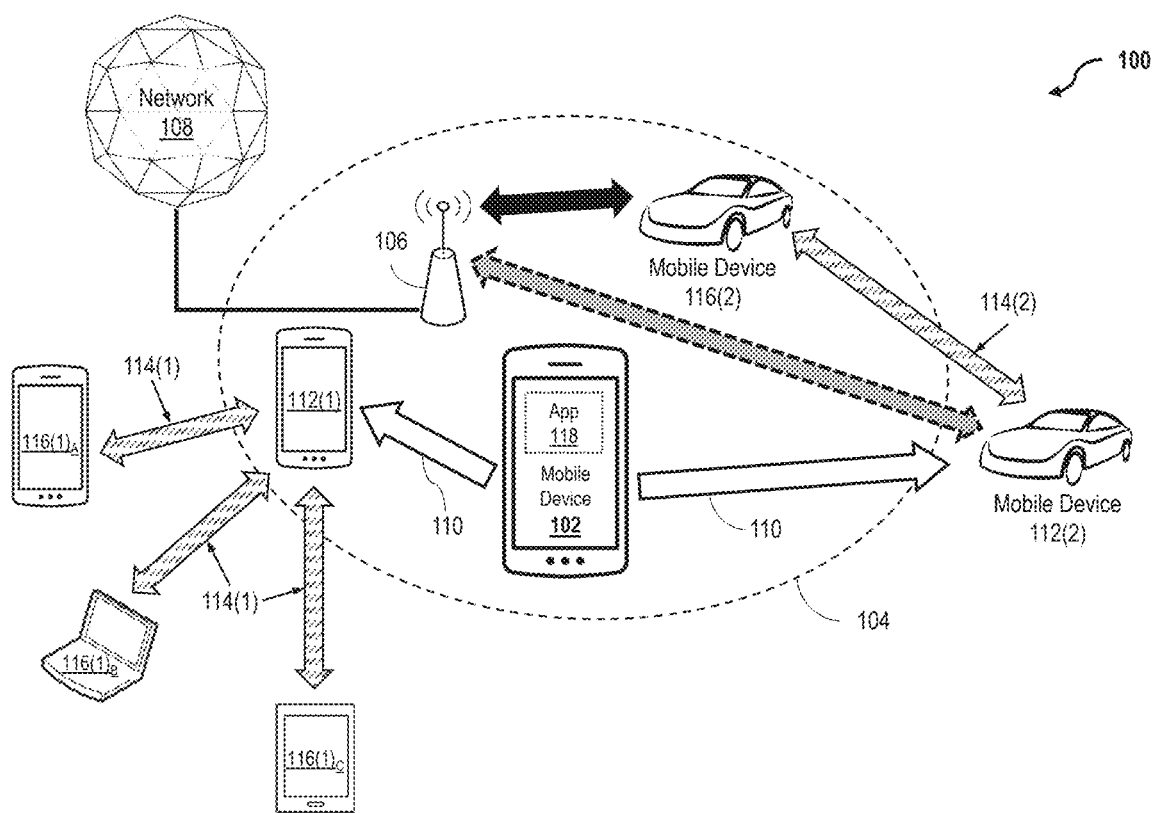
FIG. 1 is a schematic illustration of a conventional wireless communication system implementing channel occupancy time sharing.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/ modem, a satellite modem, etc.

Enhanced Cot Sharing

In an exemplary embodiment, COT sharing may be achieved for a base station and/or a wireless device for improved channel acquisition capabilities for a successive subsequent transmission (e.g., sidelink transmission signals 114, FIG. 1) originating from a first transmission (e.g., transmission signal including COT information 110, FIG. 1, whether uplink (UL) or downlink (DL)). Through such utilization of COT sharing, successive transmissions are better enabled to occur without being forced to backoff, thereby reducing both the number and the probability of listen-before-talk (LBT) failures. In a sidelink operation scenario involving direct device-to-device communication, and particularly in the case there is no base station, the following enhanced COT sharing techniques are of particular value to initiate COT sharing by a wireless device.

In one exemplary scenario, COT sharing may be advantageously implemented to utilize feedback transmissions from one or more other wireless devices. In such instances, the COT sharing will beneficially increase the transmission reliability between the wireless devices, while additionally lowering the latency of the relevant sidelink transmissions. Accordingly, in at least one exemplary embodiment, systems, methods, and mechanism are provided to implement innovative COT sharing techniques to enhance sidelink transmissions and/or the relevant feedback transmissions.

In an exemplary embodiment, COT sharing is implemented using both of a first stage SCI (SCI 1) and a second stage SCI (SCI 2). As discussed above, many conventional COT sharing techniques carry COT sharing information only over the first-stage SCI. According to the present embodiments though, and as explained in greater detail below with respect to FIG. 3, a transmitting wireless device is advantageously enabled to send both first and second stage SCIs to a receiving wireless device, and the receiver is further advantageously enabled to decode the second stage SCI to determine the identity of the transmitter. The conventional technique described above with respect to FIG. 1 contemplates use of both first and second stage SCIs, but does not utilize SCI 2 for transmitter identification. Instead, the conventional technique utilizes a separate and distinct COT sharing ID for transmitter identification. Addition of this new and separate COT sharing ID adds to the complexity and traffic of the system, while also requiring still further modifications to existing devices beyond the elements already provided in the 3GPP standards.

In contrast, in an exemplary embodiment, the present systems and methods enable a more efficient technique for determining a transmitter ID from one or both of the first stage SCI (e.g., with a simple redesign of the SCI 1) and the second stage SCI (e.g., with a simple programming modification to processing software of the receiving wireless device to enable the receiver to use shared COT information to decode the transmitter ID for the transmitting wireless device. These improvements to the conventional techniques are described further below in greater detail.

Sidelink Operation

In addition to the applications described above, sidelink operation may be implemented with respect to a number of other particular applications, including without limitation, direct device-to-device communication, peer-to-peer communication, ad-hoc communication, etc. Sidelink operation is particularly valuable with respect to the vehicular communication paradigm, namely, vehicle-to-other-device communications, such as vehicle-to-vehicle, vehicle-to-infrastructure, vehicle-to-personal device, etc. Vehicular communication is often executed over, or in cooperation with, the spectrum for Intelligent Transport Systems (ITS), or alternatively may occur among devices by way of a licensed spectrum.

Sidelink operation though, is not limited to the ITS or licensed spectra; as recognized by 3GPP TSG RAN4, sidelink operation also may be implemented among devices and/or vehicles over the unlicensed spectrum. For purposes of this description the unlicensed spectrum may be defined as a spectrum in which both Wi-Fi transmissions and/or Unlicensed New Radio (NR-U) operation may coexist. At present, the unlicensed spectrum is considered to include spectra such as 2.4 GHz spectral band, the 5 GHz unlicensed spectral range, the 6 GHz unlicensed spectral range (e.g., including the frequency bands spanning 5.825 GHz through 6.175 GHz, the CBRS spectrum, and others.

In consideration of these understood definitions, sidelink operation may be implemented among various electronic devices among a number of different exemplary case scenarios, including without limitation: (1) a first device (e.g., device 112(1), FIG. 1) is connected to a mobile network (e.g., network 108, FIG. 1), and a different second device (e.g., device 116(1), FIG. 1) is not connected to the mobile network; (2) a first device (e.g., device 102, FIG. 1) is connected to a mobile network (e.g., network 108, FIG. 1), and a different second device (e.g., device 112(1), FIG. 1) is also connected to the mobile network, or to a second mobile network; and/or (3) neither of the first and second devices is connected to the mobile network.

For these scenarios, in some embodiments, sidelink operation may be performed based on information actively configured for the device, and/or based on pre-configured information. For example, configuration for the first device may be actively accomplished using a base station (e.g., node 106, FIG. 1) when the first device is connected to the base station, whereas configuration for the second device may be pre-configured (e.g., at device manufacture and/or by an application installed on the device) since the second device is not connected to a base station. In some embodiments, such pre-configured information may include one or both of a frequency list and a list of frequency priorities in which the wireless device may perform a sidelink operation.

For the purposes of this disclosure, the person of ordinary skill in the art will understand that a "device" may refer to a number of various electronic communication devices, including without limitation, a wireless device, a vehicle or a device mounted on a vehicle, a robot, a wall-connected or wired device, a device implanted on or within a human body, and/or a device attached to, integrated with, or associated with a smart phone and/or human user.

In an exemplary embodiment, sidelink operation is performed over an unlicensed spectrum. In such scenarios though, it is possible that some other radio access technology may share the same unlicensed spectrum. For example, sidelink and Wi-Fi operation are known to coexist in the 5 GHz unlicensed spectrum, and sidelink and NR-U operation are known to coexist in the 6 GHz unlicensed spectrum. Conventionally, sidelink operation has been known to cause interference with the other coexisting operation (e.g., wireless LAN, NR-U). For example, in a single home location, where one person operates a game controller using a sidelink operation while another person uses the home Wi-Fi at the same frequency, interference between the sidelink and Wi-Fi may become significant, thereby degrading the performance and/or quality either or both of the sidelink Wi-Fi operations.

In some cases, a Wi-Fi AP may change an operating frequency when it detects a beacon from another AP or a high channel-busy ratio. Accordingly, in the case of sidelink and WLAN operation coexistence, the WLAN may be enabled to switch away from a channel that may interfere with another WLAN operation or an NR-U operation. However, although the WLAN and NR-U operation only with respect to an unlicensed spectrum, a sidelink operation may be implemented with respect to a licensed or an unlicensed spectrum.

In conventional unlicensed operation technologies, a node (e.g., a gNB, base station, AP, etc.) or a wireless device may initiate, trigger, or transmit COT sharing. The wireless device will typically initiate/trigger/transmit COT sharing based on configured signaling for a configured grant uplink transmission, whereas a base station will typically configure whether to enable a COT sharing by the wireless device for a configured grant uplink transmission. For the purposes of this description, a configured grant uplink transmission is considered to refer to a periodic uplink transmission by the wireless device based on configured/pre-configured periodic uplink resources. The shared COT by the wireless device (e.g., the COT sharing triggered/initiated by the wireless device) may then be used by the base station for downlink (DL) transmission when certain conditions are met, including without limitation, (i) the DL transmission is destined for the wireless device, (ii) DL transmission(s) for other wireless device(s) may not be associated with the base station-initiated COT sharing, and/or (iii) the DL transmission(s) may not occur during the base station/gNB-initiated COT for any wireless device.

In an exemplary embodiment, the present enhanced COT sharing techniques for sidelink unlicensed operation are particularly advantageous for feedback transmission, successive retransmissions, or similar. Nevertheless, in the case of wireless devices communicating directly with one another without going through a base station or an AP, some COT sharing performance issues should be addressed.

For example, in the case of a first wireless device sharing a COT for a second wireless device, the second wireless device may initiate transmission based on a simplified listen-before-talk (LBT) operation, such as a Cat 2 LBT. However, the second wireless device may still interfere with an on-going transmission by a third wireless device, AP, or base station. That is, performance degradation may result when a resource pool for a sidelink operation is discontinuous, such as in the case where the third wireless device/AP/base station initiates communication between a first sidelink resource of the resource pool and a second sidelink resource of the resource pool when the first sidelink resource and the second sidelink resource are not continuous. In another example, in the case where multiple wireless devices initiate COT sharing, significant performance and/or coexistence effects may result with respect to other operations, such as Wi-Fi or NR-U.

Conventionally, COT sharing by a wireless device has been limited to a configured grant configuration of a sidelink operation. As described above, a COT may be shared by one or more wireless devices as long as transmission(s) are destined for the wireless device. However, COT sharing as sidelink operation may be limited where the configured grant configuration(s) are not configured. Moreover, conventional wireless devices are typically enabled to decode a first-stage SCI that does not include a transmitter identifier. Without a transmitter identifier, the decoding wireless device will not know which other wireless device has transmitted the first-stage SCI, even in the case where COT sharing information is carried over the first-stage SCI. As described above, one conventional approach sends an additional COT sharing ID to identify the COT sharing source, but this approach inefficiently requires additional traffic resources.

In an exemplary embodiment, these conventional challenges are overcome by innovative improvements to the design of one or both of the first- and second-stage SCIs. Through such modifications, the COT sharing wireless devices are able to utilize existing SCI resources without requiring the transmission of a separate ID resource. In some embodiments, the first-stage SCI may be redesigned to enable a receiving device to decode source information therefrom. In other embodiments, the receiving device may be modified to enable decoding of the second-stage SCI to obtain source identification and/or a COT indication. The enhanced SCI(s) may therefore advantageously indicate applicable conditions to enable or disable COT sharing.

According to the present systems and methods, enhanced COT sharing may be achieved for a base station/wireless device to improve channel acquisition for a successive transmission from an initial transmission (e.g., UL or DL). These enhanced COT sharing techniques advantageously reduce the probability of LBT failure by improving the likelihood that the successive transmission will occur without backoff. These techniques are particularly useful in the case of direct device-to-device sidelink operation, where the COT sharing is initiated by one wireless device without intervention or cooperation from a base station. The enhanced COT sharing embodiments herein thus realize significant benefits with respect to feedback transmission from one or more other wireless devices, while also achieving improved reliability and/or lower latency sidelink transmissions.

In an exemplary embodiment, enhanced COT sharing by a first wireless device is implemented to improve sidelink and/or feedback transmissions. For a sidelink operation in an unlicensed spectrum, the present enhanced COT sharing techniques achieve one or more of the following advantages: (1) a COT sharing may be enabled or disabled for a sidelink operation for a sidelink resource pool (e.g., the sidelink resource pol may be configured with enabled or disabled COT sharing); (2) a COT sharing may be enabled or disabled for one or more sidelink priority levels/values (e.g., a threshold value may be configured such that a COT sharing is performed for priority levels/values indicating a higher priority than the threshold value, which may further utilize the COT sharing if so configured); and (3) a COT sharing may be enabled or disabled based on one or more active channel conditions (e.g., no NR-U operation or AP detected in an overlapped frequency to a sidelink resource pool).

The present enhanced COT sharing embodiments are further advantageous in the case where, when a COT sharing is enabled, a wireless device may initiate COT sharing upon determination that one or more particular conditions are met, including without limitation: (a) the wireless device has a sidelink transmission having a priority level higher than or equal to a threshold of a COT sharing priority (e.g., a particular priority level higher than the threshold may nevertheless be determined to indicate a lower priority value/level with respect an even higher priority value/level); (b) the wireless device has a sidelink transmission requiring feedback and/or retransmission, and/or the sidelink transmission is unicast and/or multicast; (c) the wireless device is a resource coordinator or configured to enable COT sharing by a base station or an AP; and (d) the wireless device has a sidelink transmission with reservation periodicity being less than or equal to X, where X is a maximum COT sharing interval, an interval configured for the COT sharing as a maximum COT sharing interval, a prefixed duration, or configured for a COT sharing interval for a priority of the sidelink transmission for a sidelink resource pool.

The present enhanced COT sharing embodiments are still further advantageous in the case where, when a wireless device receives a COT sharing indication by way of a first-stage SCI from another wireless device, the device may utilize the COT sharing with a Cat 2 LBT, or an LBT designed for the COT sharing, upon determination that one or more of the following alternative conditions are met, including without limitation: (a) a sidelink transmission of the device has a priority level/value greater than or equal to a first priority indicated in the first-stage SCI; (b) a sidelink transmission of the device satisfies conditions of the COT sharing indicated in the first-stage SCI (e.g., unicast-only, multicast-only, broadcast-only, only destined to the second wireless device, etc), and/or the first-stage SCI may indicate a format of a second-stage SCI, and the device may utilize the COT sharing when the second-stage SCI for the sidelink transmission has the same format; (c) the sidelink transmission is associated with the first-stage SCI (e.g., the sidelink transmission is a feedback transmission for the first-stage SCI, etc); and (d) the wireless device does not detect an NR-U base station or an AP in an overlapped frequency.

In an exemplary embodiment, a second wireless device may determine whether to utilize a COT sharing indicated by the received control information (if enabled) based on one or more SCI fields of a first- and/or second-stage SCI of a received control information transmitted by a first wireless device. The first wireless device may then determine whether to enable the COT sharing based on one or more relevant conditions being met, described further below. For example, an LBT type may be determined based on whether a feedback resource overlaps with resources indicated as a COT sharing by another wireless device. In this scenario, the present enhanced COT sharing techniques advantageously enable the wireless device to transmit feedback resources with lower collision probability, higher reliability, and lower LBT overhead.

COT Sharing Enablement/Disablement

Figure 2:
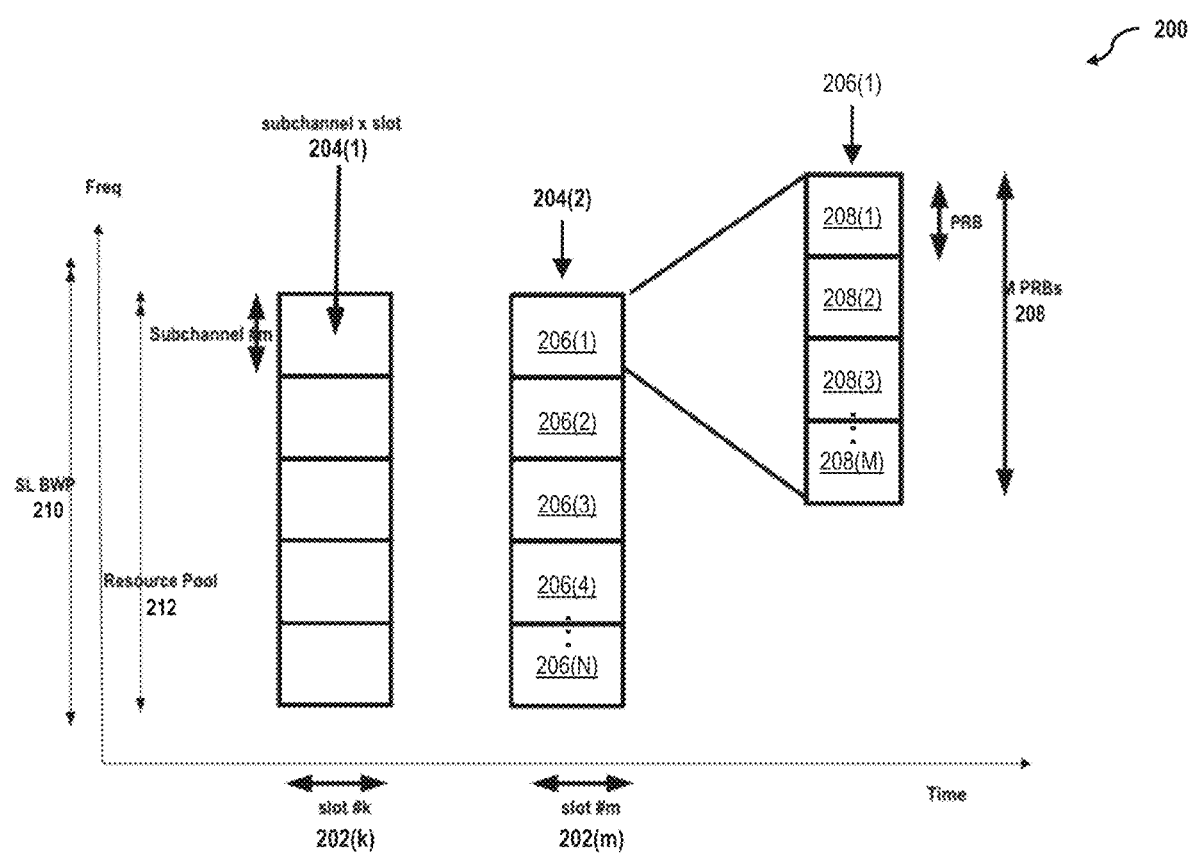
FIG. 2 is a graphical illustration depicting a resource allocation configuration for a sidelink shared channel.

In an exemplary embodiment, enhanced COT sharing may be enabled or disabled based on one or more sidelink conditions of configurations. A sidelink resource pool (sl-ResourcePool, e.g., resource pool 212, FIG. 2) may determine/indicate the number of subchannels (e.g., subchannels 206, FIG. 2), a starting subchannel, a time domain resource, a preemption condition, parameters related to a preemption operation, power control parameters, etc. (described further below with respect to FIG. 5). In an embodiment, in the case where a sidelink resource pool is configured in an unlicensed spectrum, one or more additional parameters of a COT sharing may be configured for a sidelink operation using the sidelink resource pool. Such additional parameters may configured according to one more of the following exemplary case scenarios.

In a first case scenario, COT sharing is enabled or disabled for a sidelink BWP (e.g., BWP 210, FIG. 2), where the sidelink BWP includes the sidelink resource pool, using an enablement parameter. In this case, if the relevant parameter is determined to be present, but configured as disabled, a COT sharing may not be allowed for the sidelink resource pool, that is, disabled for one or more sidelink resource pools configured in the sidelink BWP. When the COT sharing is disabled, a SCI field related to a COT sharing may not be present in a first-stage SCI scheduled over the one or more sidelink resource pools. In contrast, when the COT sharing is enabled (e.g., the relevant parameter is configured as enabled), a wireless device may initiate a COT sharing, or a second wireless device may utilize a COT sharing indicated/initiated by the first wireless device operating with respect to the sidelink BWP.

In a second case scenario, COT sharing is enabled or disabled for an individual sidelink resource pool. Accordingly, when the relevant enablement parameter is present, COT sharing may be applied (i.e., when configured as enabled) for the sidelink resource pool. This parameter may be additionally configured to also enable or disable COT sharing of the entire sidelink BWP that includes the resource pool. In this case, the sidelink BWP may itself be configured to enable COT sharing from at least one other sidelink resource pool of the sidelink BWP.

In a third case scenario, COT sharing may be adjustably configured for all or individual ones of: (a) the sidelink BWP(s); (b) the sidelink resource pool(s); (c) configured grant configuration(s) (SL CGs); (d) the physical sidelink shared channel (PSSCH) configuration; (e) the sidelink channel; (f) the subchannel(s) of a sidelink BWP; (g) the sidelink carrier(s); (h) the priority of the sidelink, a sidelink resource pool, and/or the sidelink BWP; and (i) a combination of one or more of the preceding configurations. In an exemplary embodiment, a COT configuration includes one or more of an offset value, a duration, a channel access priority, a sidelink priority, a retransmission number, a sidelink resource pool index, a packet delivery deadline, a cast type (e.g., unicast, multicast, broadcast, etc.), a feedback mode (e.g., ACK/NACK, NACK only, no feedback, etc.), and one or more sidelink channel types (e.g., PSSCH, PSCCH, PSFCH).

In an embodiment, the offset value may indicate when the COT sharing may start (if enabled) after end of sidelink transmissions carried based on an SCI indicating the COT sharing. The duration may indicate a duration of the COT sharing once started, and/or a time to end COT sharing (e.g., from the SCI). The channel access priority may indicate the priority level for a second wireless device to utilize when the second wireless device transmits utilizing the COT sharing. The sidelink priority may indicate a threshold where the second wireless device may have a sidelink transmission priority value greater than or equal to the threshold for utilizing the COT sharing, and the priority may be based on a configuration/mapping of priority value(s) to priority(ies). The retransmission number may indicate a threshold value for utilizing the COT sharing, such as when a sidelink transmission has been configured with a number of retransmissions greater than or equal to the threshold value. The cast type may indicate a single cast type, or a combination of cast types, that may be used for the COT sharing. The feedback mode may indicate a condition to utilize the COT sharing of a sidelink transmission based on the feedback mode of the sidelink transmission. The sidelink channel type may indicate a condition to utilize the COT sharing of a sidelink transmission based on a channel type of the sidelink transmission.

In a fourth case scenario, where COT sharing is enabled by configuration or pre-configuration (e.g., through the sidelink BWP or resource pool), COT sharing may be further enabled based on one or more conditions with respect to first, second and third wireless devices.

That is, with respect to the first wireless device, when a COT sharing is enabled, the first wireless device may initiate a sidelink unlicensed (SL-U) COT sharing based on one or more conditions, including without limitation: (a) the first wireless device enables a COT sharing for the sidelink operation in a frequency, channel, or spectrum in response to not detecting one or more synchronization/beacon signals from a base station/AP, and the first wireless device may be further configured to stop the COT sharing upon detection of one or more such synchronization or beacon signals; (b) the first wireless device is (pre) configured with one or more COT sharing configuration parameters, including without limitation an offset, a duration, a channel access priority, a sidelink priority, a number of retransmissions, a sidelink resource pool index, a packet delivery deadline, a cast type, a feedback mode, a sidelink channel type, etc., and the first wireless device may then initiate a COT sharing by way of an SCI of a sidelink transmission, in the case where the sidelink transmission satisfies one or more of the (pre) configured parameters; and (c) the first device may enable/initiate a COT sharing by way of an SCI of a sidelink data/shared channel transmission in the case where a COT sharing is not be enabled/initiated by a broadcast, the synchronization signals, or the feedback channels.

With respect to the second wireless device, when a COT sharing is enabled, the second wireless device may determine whether to utilize a COT sharing based on one or more conditions being met, including without limitation: (a) the second wireless device utilizes a COT sharing for the sidelink operation in a frequency, channel, or spectrum in response to not detecting one or more synchronization and/or beacon signals from one a base station/AP, and the second wireless device may not utilize the COT sharing upon detection of one or more such synchronization/beacon signals; (b) the second wireless device is (pre) configured with one or more COT sharing configuration parameters, and the second wireless device may then utilize the COT sharing upon determination that the sidelink transmission satisfies one or more of the COT sharing configuration parameters; and (c) a COT sharing is enabled/initiated by an SCI of a sidelink data/shared channel transmission in the case where COT sharing is not be enabled/initiated by a broadcast, synchronization signals, or feedback channels. In the case where the second wireless device detects multiple SCIs (e.g., indicating multiple COT sharings of a sidelink BWP or resource pool), the second wireless device may further configured to determine a COT based on (i) intersections of the multiple COT sharings, and/or unions of the multiple COT sharings, assuming that other conditions are common among the multiple COT sharings.

With respect to the third wireless device, when a COT sharing is enabled, the third wireless device may configured to reflect resources indicated by a COT sharing based on one or more conditions being met, including without limitation: (a) the third wireless device reflects resources indicated by a COT sharing based on a resource selection procedure including one or more of (i) an "applying COT sharing in a resource selection" parameter (e.g., when enabled, the third wireless device may apply the resources in the resource selection procedure as unavailable resources), (ii) a "COT sharing resource selection priority" parameter (e.g., when configured, the third wireless device may apply the resources in the resource selection procedure when an SCI indicating the COT sharing indicates higher priority than the COT sharing resource selection priority or a priority associated with the COT sharing has higher priority than the COT sharing resource selection priority), (iii) one or more second preemption parameters of (e.g., the third wireless device may apply the resources in the resource selection procedure when one or more of the second preemption parameters are configured); (b) a first set of parameters for the resource selection procedure is based on a first COT sharing of an SL-U operation being configured separately from a second set of parameters for the resource selection procedure (e.g., based on a second COT sharing of a UL operation in a co-channel or overlapped frequencies); and (c) one or more (pre) configured COT sharing configuration parameters, and the third wireless device may then apply, in the resource selection procedure, resources of the COT sharing in response to the sidelink transmission satisfying one or more of the COT sharing configuration parameters.

For one or more of the preceding exemplary case scenarios, in the case where a wireless device utilizes a COT sharing, the wireless device may be further configured to determine an LBT type and/or an LBT priority class based on one or more parameters associated with the COT sharing. In an exemplary embodiment, for COT sharing a Cat2 LBT may be utilized for the LBT type.

COT Sharing for Sidelink Feedback

In a sidelink, feedback resources may be present in every slot of the sidelink, or in only some slots thereof (e.g., every two slots, every four slots, etc.). An exemplary format for such present sidelink resources is described further below with respect to FIG. 3.

Figure 3:
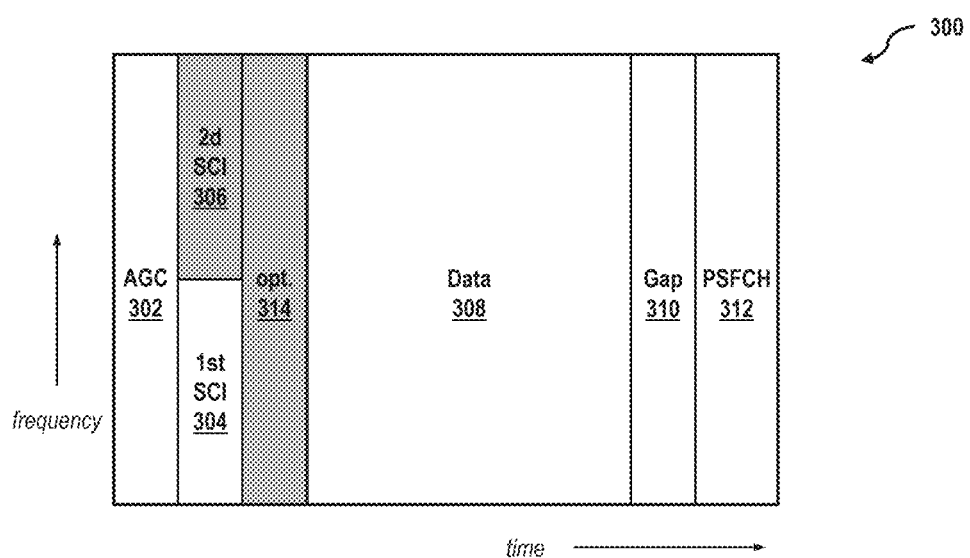
FIG. 3 is a graphical illustration depicting an exemplary formatting architecture for a sidelink resource.

FIG. 3 is a graphical illustration depicting an exemplary formatting architecture 300 for a sidelink resource. In the exemplary embodiment depicted in FIG. 3, architecture 300 includes one or more of an automatic gain control (AGC) portion 302, a first-stage SCI 304, a second-stage SCI 306, a data portion 308, a gap portion 310, and an optional sidelink feedback resource portion 312 (e.g., a PSFCH). In the case where sidelink feedback resource 312 is not present in a sidelink slot, data resources may be present up to the last OFDM symbol of the sidelink slot. In the exemplary embodiment, second-stage SCI 306 further includes an optional portion 314 that may precede, or be integrated with data portion 308.

In exemplary sidelink operation, a wireless device may transmit a sidelink feedback resource based on a feedback mode indicated by an SCI of data received by the wireless device. For example, in the case of unicast data, and the where the feedback mode indicates to transmit the sidelink feedback, the wireless device may transmit the sidelink feedback using the sidelink feedback resource. In an embodiment, a sidelink feedback transmission/PSFCH may span one or more OFDM symbols (e.g., 1-3 OFDM symbols). However, in the case where a wireless device may not acquire a channel due to collision, the wireless device may not be able to transmit the feedback. On the other hand, when a sidelink feedback of a Cat2 LBT (e.g., without a backoff operation) is always on, or similarly in the case of a sidelink feedback transmitted without an LBT, such feedback transmissions may interfere with other ongoing transmissions (e.g., NR-U, LAA, Wi-Fi, etc.) and thereby degrade their performance. The LBT type (e.g., no LBT, Cat 2 LBT, Cat 4 LBT, etc.) may be indicated through SCI scheduling data, or may be configured by a higher layer signaling. In an embodiment, a channel is not reserved for feedback in the case where a Cat 2 LBT, or no LBT, is indicated.

In an exemplary embodiment a COT sharing mechanism is further utilized in the case where a wireless device expects a feedback for a sidelink transmission. In this case, the wireless device may be configured to first determine a COT sharing, and then to indicate the COT sharing through an SCI of the sidelink transmission. For example, when the COT sharing is indicated, a second wireless device receiving the COT sharing may determine a duration of the COT sharing based on an sl-PSFCH-Period (e.g., 2, 4, 1, etc.). Accordingly, in the case where the sl-PSFCH-Period (e.g., a slot offset between the sidelink transmission and the feedback) is 2, the PSFCH duration may indicate two time slots, as well as an offset. Alternatively, the COT duration start may be determined based on the end OFDM symbol of the sidelink transmission.

In some embodiments, the second wireless device may not be a transmitter of the feedback, and the feedback may instead be transmitted from a third wireless device. In this case, the third wireless device may be configured to determine the LBT type, such as Cat 2 LBT or no LBT, for the feedback based on the COT sharing. In such scenarios, the COT sharing may indicate the resource(s) for the feedback. In an embodiment, either of the second or third wireless devices may utilize resources of the COT sharing, that is, other than resources overlapping with the feedback, for other transmissions.

In some embodiments, in the case where a wireless device receives an SCI indicating a COT sharing over a PSFCH resource of a sidelink slot, the wireless device may be configured to determine a first category LBT for a second feedback over the PSFCH resource of the sidelink slot, irrespective of whether the SCI is intended for the wireless device. Accordingly, when an SCI indicates a COT sharing over a PSFCH resource, a wireless device having a feedback resource overlapping with the PSFCH resource in the time domain (and/or the frequency domain) may utilize the first category LBT. Otherwise, the wireless device may be further configured to utilize/determine a second category LBT. For example, in the case where the first category LBT is a Cat2 LBT or no LBT, the second category LBT may be a Cat4 LBT or an LBT with backoff.

Figure 4:
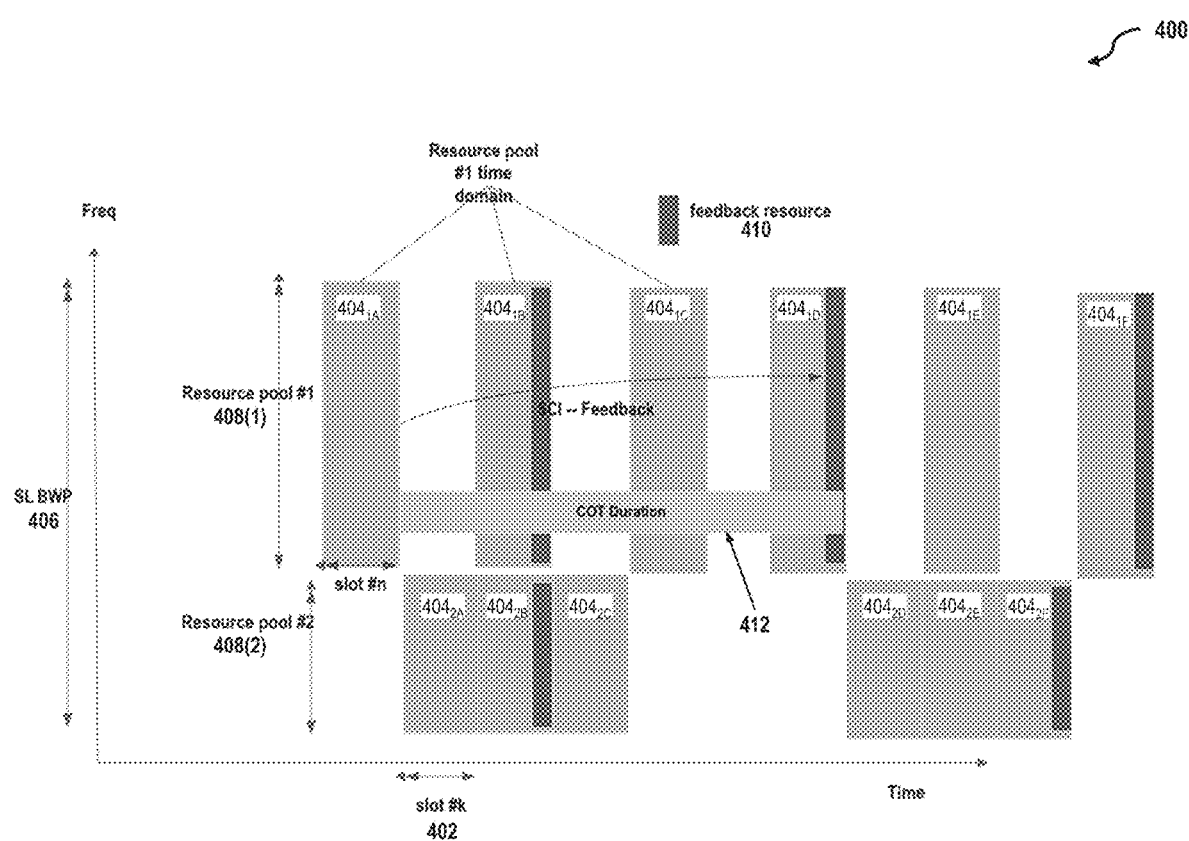
FIG. 4 is a graphical illustration depicting an exemplary resource allocation configuration for a sidelink shared channel utilizing channel occupancy time sharing.

FIG. 4 is a graphical illustration depicting an exemplary resource allocation configuration 400 for a sidelink shared channel utilizing COT sharing. In the exemplary embodiment depicted in FIG. 4, configuration 400 is similar, in some aspects, to resource allocation configuration 200, and similarly distributes, over a plurality of time slots 402, a plurality of respective frequency channel sidelink slots 404. For ease of explanation, individual subchannels and RBs are not shown in FIG. 4. Also similar to configuration 200, in exemplary resource allocation configuration 400, a sidelink BWP 406 configures a plurality sidelink resource pools 408. Two sidelink resource pools 408(1), 408(2) are depicted in FIG. 4 by way of example, and not in a limiting sense. The person of ordinary skill in the art will understand that additional sidelink resource pools may be configured without departing from the scope herein.

More particularly, for sidelink BWP 406, a first wireless device may be configured with first resource pool 408(1) for a sidelink transmission, and a second wireless device may be configured with first resource pool 408(1) or second resource pool 408(2) for a sidelink reception. In some embodiments, a third wireless device additionally may be configured with first resource pool 408(1) for a sidelink reception.

In the exemplary embodiment depicted in FIG. 4, some of sidelink the plurality of sidelink slots 404 contain a feedback resource 410. For example, first resource pool 408(1) includes a feedback resource 410 in every other sidelink slot 404 (slots $404_{1B}$, $404_{1D}$, $404_{1F}$, in this example), whereas second resource pool 408(2) includes feedback resources for 10 in every fourth sidelink slot 404 (slots $404_{2B}$, $404_{2F}$, in this example). For this example, the first sidelink feedback resource 410 of first resource pool 408(1) may be in a sidelink slot n+1 (e.g., slot $404_{1B}$) of first resource pool 408(1), the second sidelink feedback resource 410 a sidelink slot n+3 (e.g., slot $404_{1D}$), the third sidelink feedback resource 410 in a sidelink slot n+5 (e.g., slot $404_{1F}$), etc. In a similar manner the first sidelink feedback resource 410 of second resource pool 408(2) may be in a sidelink slot k+1 (e.g., slot $404_{2B}$), and the second sidelink feedback resource 410 of second resource pool 408(2) may be in a sidelink slot k+5 (e.g., slot $404_{2F}$), etc.

In exemplary operation, the present embodiments are further advantageously configured to utilize a COT duration 412 to optimize the timing for distribution of feedback resources 410 among the plurality of sidelink slots 404. For example, as illustrated in FIG. 4, when the first wireless device transmits an SCI indicating a COT sharing in a slot #n (e.g., slot $404_{1A}$), the second and/or the third wireless device may determine LBT type(s) of feedback resources based on the SCI. However, for configuration 400, COT duration 412 of the indicated COT sharing spans three sidelink slots 404 of first resource pool 408(1), but the feedback timing for first resource pool 408(1) has been determined/configured as two slots (e.g., sl-MinTimeGa-pPSFCH=2). Accordingly, by considering, COT duration 412 together with feedback resources 410, it may be further advantageously determined, for this example, that the slot n+3 (e.g., slot $404_{1D}$) will be the first sidelink slot 404 having a feedback resource 410 that meets the feedback timing requirement of two slots, and which does not occur within the middle of COT duration 412.

In a similar manner, the second and/or third wireless device may alternatively determine the COT duration 412 to span three slots (e.g., based on the sl-MinTimeGapPSFCH and/or sl-PSFCH-period). Accordingly, in the case where the second wireless device may receive a second SCI indicating a second COT in a slot #n+1, the second wireless device may determine a second COT duration 412 of the second COT as spanning two slots, and thus the slot #n+3 (e.g., slot $404_{1D}$) will again be the next sidelink slot 404 having a feedback resource 410 that accounts for the second COT duration 412.

In some embodiments, the second wireless device may determine that feedback resource(s) 410 of second resource pool 408(2) are overlapping, in the time domain, with resources indicated by the COT sharing as resources shared by the COT sharing indication of the SCI. In such cases, namely, where the feedback resource(s) 410 overlap with COT duration 412 (or resources of a COT sharing) in at least the time domain, the second wireless device may be further advantageously configured to determine a first LBT type for a feedback transmission using the feedback resources 410.

In some embodiments, the second wireless device may be further configured to determine a second LBT type in response to feedback resource(s) 410 overlapping with resources of the COT sharing in the time domain, but which are not overlapping with the resources of the COT sharing in the frequency domain (e.g., in the case where feedback resource(s) 410 of second resource pool 408(2) may not be considered as resources indicated by the COT sharing of the SCI).

In an embodiment, the test third wireless device may be configured to determine feedback resources 410 in the sidelink slot #n+1 (e.g., slot $404_{1B}$) or the sidelink slot #n+3 (e.g., slot $404_{1D}$) of first resource pool 408(1) as overlapping resources with the COT sharing. In such instances, the third wireless device may be further advantageously configured to determine the first LBT type for the overlapping feedback resources=410, and determine the second LBT type for other feedback resource(s) 410 that are not overlapping with resources indicated by any COT signaling of first resource pool 408(1) and/or second resource pool 408(2).

In an exemplary embodiment, a wireless device may be configured to determine, for a feedback transmission of a first sidelink transmission, a first LBT type or a second LBT type based on one or more of the received SCI, the scheduling of one or more second sidelink transmissions, and/or indications of COT sharing(s) overlapping with a first feedback resource 410, in at least the time domain, where that first feedback resource 410 is used for the feedback transmission. In this example, one or more second sidelink transmissions may include the first sidelink transmission, and may further include at least one additional second sidelink transmission equal to the first sidelink transmission. In some instances, the second sidelink transmissions need not include the first sidelink transmission. Accordingly, in response to the determination that resources of the COT sharing(s) may overlap with the first feedback resource, the wireless device may be still further configured to determine the first LBT type, or alternatively, the wireless device may determine the second LBT type.

COT Resources in a Resource Selection Procedure

Figure 5:
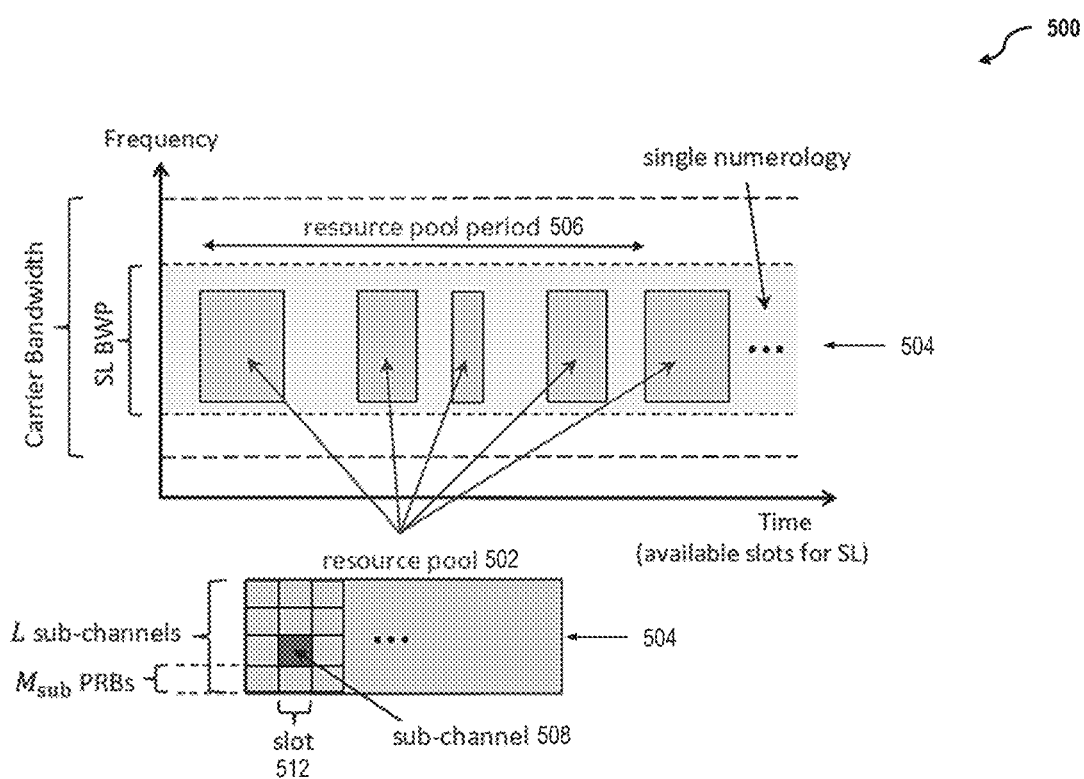
FIG. 5 is a graphical illustration depicting an exemplary sidelink bandwidth-part.

FIG. 5 is a graphical illustration depicting an exemplary sidelink BWP 500. In the exemplary embodiment depicted in FIG. 5, sidelink BWP 500 is configured for at least one sidelink resource pool 502 including a plurality of sidelink slots 504 distributed in time over a resource pool period 506. Sidelink resource pool 502, may for example, be contained within a carrier bandwidth of sidelink BWP 500, and may also conform to a single numerology. In an exemplary embodiment, sidelink resource pool 502 may further include a subset of frequency subchannels 508 (e.g., L subchannels 508) of sidelink BWP 500, as well as a subset of time domain resources 510 (e.g., M PRBs 510) allocated across frequency subchannels 508 within individual time domain sub-slots 512. In the exemplary embodiment, resource pool period 506 may be advantageously configured to establish the set of time/frequency resources 510 for sidelink resource pool 502 to periodically occur or be configured.

Figure 6:
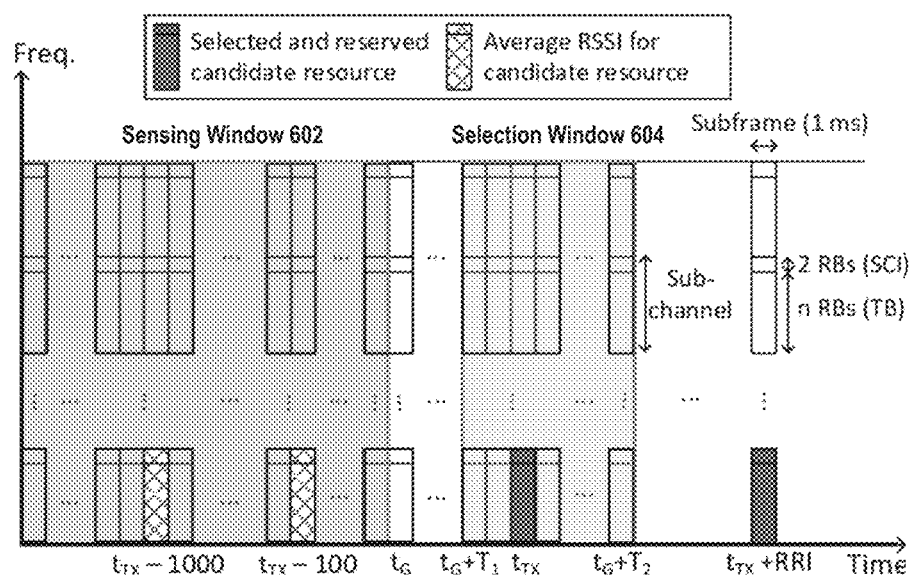
FIG. 6 is a graphical illustration depicting an exemplary subchannel selection scheme utilizing channel occupancy time sharing.

FIG. 6 is a graphical illustration depicting an exemplary subchannel selection scheme 600 utilizing COT sharing. In the exemplary embodiment depicted in FIG. 6, a wireless device may be advantageously configured to perform a resource selection based on channel sensing. More specifically, in a sensing window 602, wireless device receives control information from a plurality of devices operating within range of the wireless device, and then, in a selection window 604, the wireless device is enabled to reserve future subchannel resources for enhanced collision avoidance. In exemplary operation of scheme 600, the control information received by the wireless device in sensing window 602 includes COT signals (e.g., similar to the exemplary principles described above with respect to FIG. 4), and may additionally include an average received signal strength indicator (RSSI) for candidate subchannel resources. Using this information received in sensing window 602, wireless device is further configured to optimize selection of sidelink resource(s) for one or more sidelink transmissions in selection window 604.

In an exemplary embodiment, the size of selection window 602 may be determined based on at least one of a transmission time of the one or more sidelink transmissions and a packet delay boundary (represented as T2 in FIG. 6). In some embodiments, a selected resource may occur periodically (e.g., at a resource reservation interval (RRI)). Operation of scheme 600 is thus similar, in some aspects, to conventional resource selection techniques, except that, by further utilizing COT signals, including the COT duration as described above, resource selection according to scheme 600 achieves significant improvements over conventional techniques by significantly reducing the probability of collision through the innovative additional consideration of COT sharing.

Figure 7:
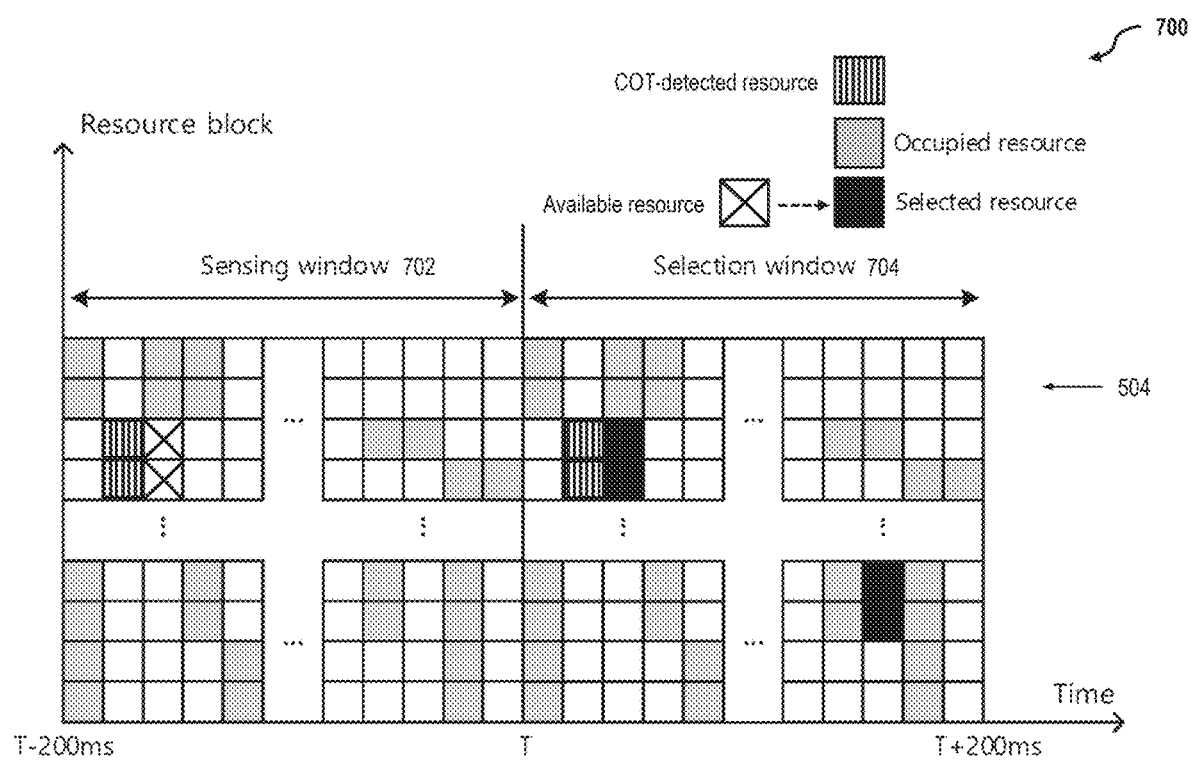
FIG. 7 is a graphical illustration depicting an exemplary resource selection scheme utilizing channel occupancy time sharing.

FIG. 7 is a graphical illustration depicting an exemplary resource selection scheme 700 utilizing COT sharing. In the exemplary embodiment depicted in FIG. 7, resource selection scheme 700 is similar, in many aspects, to resources selection scheme 600, FIG. 6, except that selection scheme 700 advantageously operates at the resource block level, as opposed to the subchannel resource level of selection scheme 600. The person of ordinary skill in the art though, will understand that selection schemes 600 and 700 are not exclusive of one another, and in some embodiments, may be implemented by one or more wireless devices together in a complementary manner.

Accordingly, in exemplary operation of selection scheme 700, in a sensing window 702, the wireless device may determine that one or more detected resources are busy, or scheduled, and therefore unavailable for future selection, in a selection window 704, based on one or more reservation periodicities indicated by one or more SCIs detected during sensing window 702. That is, the wireless device is generally limited to selecting resources that do not overlap with the resources that are determined to be unavailable in sensing window 702. Selection scheme 700 may therefore operate similarly, in at least some aspects, to conventional resource selection techniques. However, conventional resource selection techniques do not address the particular challenge arising from the case where a COT sharing is both enabled and indicated/initiated by an SCI. That is, conventional resource selection procedures are transparent to COT sharing, and therefore may indicate that a resource is available for selection, despite potential interference from the COT sharing.

According to selection scheme 700 though, this potential interference problem is significantly mitigated through integration of the enhanced COT sharing principles described above source selection. In the exemplary embodiment, in addition to conventional resource sensing techniques to detect occupied resources, a wireless device according to selection scheme 700 may be further advantageously configured to execute enhanced resource selection procedures that may additionally detect which resources may be sensed as available, but are actually indicated (e.g., in an SCI) by a COT sharing in a resource selection procedure, and are therefore not fully available for future selection by the wireless device without potential collisions.

In an exemplary embodiment, the enhanced selection procedure of scheme 700 considers an SCI indicating one or more of a first set of resources for one or more sidelink transmissions, a second set of resources (i.e., that are not overlapping with the first set of resources) for a COT sharing, and a reservation periodicity. The wireless device is thus configured to determine that the first set of resources occurs after the reservation periodicity with a first priority value indicated by the SCI (e.g., a value of a priority field in a SCI format 1-A or a new SCI format based on the SCI format 1-A including COT-related information). The wireless device may then determine a third set of resources based on one or more of the indicated first set of resources, priority, and reservation periodicity. In some embodiments, the wireless device may be further configured to determine a fourth set of resources based on one or more of the second set of resources, a priority of a COT sharing, and a second reservation periodicity of the COT sharing (if any), and/or offset/duration of the COT sharing. Through these enhanced sensing and selection techniques, the present systems and methods are able to realize significant improvements in resource selection that substantially reduce the likelihood of interference and/or collisions.

Subchannel Interlacing

Use of an unlicensed spectrum, such as the 5 GHz unlicensed spectrum, is subject to a number of regulatory requirements and industry standards. For example, according to the 3GPP ETSI standards referenced above, the channel occupied bandwidth should be greater than 70% of a transmission. To meet these requirements and standards, NR-U UL PUSCH and PUCCH transmissions have adopted techniques for interlaced resource allocation and transmission. Sidelink operations occurring in the same unlicensed spectra are equally subject to compliance with the same regulatory requirements and industry standards. Accordingly, there is an additional desire in the industry to develop new techniques for sidelink resource allocation that leverage advantages similar to those realized from the recent adoption of newer interlacing schemes for different transmissions.

More particularly, in NR-U, a new resource allocation type, i.e., RA type 2, has been recently introduced to support interlaced PUSCH transmission. The RA type 2 assigns a first bitmap to indicate one or more interlaces, and a second bitmap to indicate one or more RB sets (e.g., LBT bandwidths). A wireless device then selects RBs indicated by both bitmaps. In the case of a sidelink transmission though, implementation of a similar resource allocation mechanism (i.e., extending RA type 2 for a sidelink transmission) gives rise to a number of challenges. For example, although sensing and reservation may be theoretically executed at the interlace level instead of the subchannel level, the simple substitution of a subchannel in a sidelink operation with an interlace may significantly limit the flexibility of a subchannel configuration in a sidelink resource pool, since such interlaced resource blocks would be common to all resource pools of a sidelink BWP, and also with one or more UL sidelink BWPs of a UL carrier sharing the same spectrum with the sidelink BWP.

The following embodiments overcome these challenges by providing innovative systems and methods to support interlacing for sidelink transmissions. In an exemplary embodiment, a subchannel may be defined over a same interlace, or over adjacent interlaces, thus retaining the subchannel to allow resource allocation flexibility in each sidelink resource pool. That is, some interlacing strategies are implemented for the subchannel without substituting the subchannel entirely for the interlace. In some embodiments, a subchannel may correspond to one or more interlaces. In other embodiments, a subchannel may include RBs belonging to a single interlace, or one or more adjacent interlaces. In at least one embodiment, the subchannel itself is redefined in consideration of interlaced RBs, but again without completely replacing the subchannel for the interlace. In this scenario, interlaced RBs may be common with a UL BWP utilizing the same frequency.

Referring back to FIG. 5, above, a wireless device may be configured/indicated with a sidelink BWP (e.g., sidelink BWP 500) that may be equal to, or a subset of, a carrier bandwidth, and which may include comprise one or more sidelink resource pools (e.g., resource pool 502). In an exemplary embodiment, one or more configuration parameters of a sidelink resource pool (sl-ResourcePool information element) may include one or more of (i) a starting resource block (e.g., sl-StartRb-Subchannel) indicating where a frequency resource of the sidelink resource pool begins, (ii) a number of subchannels (e.g., sl-NumSubchannel), (iii) a size of a subchannel (e.g., sl-SubchannelSize), and (iv) time domain resources (e.g., sl-TimeResource) that may indicate a set of sidelink slots within a resource pool periodicity.

As described above, a resource pool may be represented as a combination of subchannels (e.g., subchannels 508) in a sidelink slot (e.g., sidelink slots 504). Thus, an individual subchannel in a sidelink slot may represent a minimum scheduling granularity for sidelink data with respect to a physical sidelink shared channel (PSSCH). In the exemplary embodiments described above, an individual subchannel may contain a contiguous plurality of M PRBs, where each PRB may individually include K (e.g., K=12) contiguous resource elements/subcarriers.

Subchannel Level Interlacing

Accordingly, to integrate interlacing techniques at the subchannel level, existing regulatory requirements regarding channel occupied bandwidth (OCB) for other interlaced transmissions are considered, in addition to the existing regulatory requirements for sidelink operations performed in an unlicensed spectrum. In an exemplary embodiment, since a subchannel may be considered as a minimum scheduling granularity in the sidelink operation, to maintain the subchannel integrity, it may be desirable to interlace multiple subchannels across a sidelink BWP. A simplified approach to subchannel-level interlacing is described further below with respect to FIG. 8.

Figure 8:
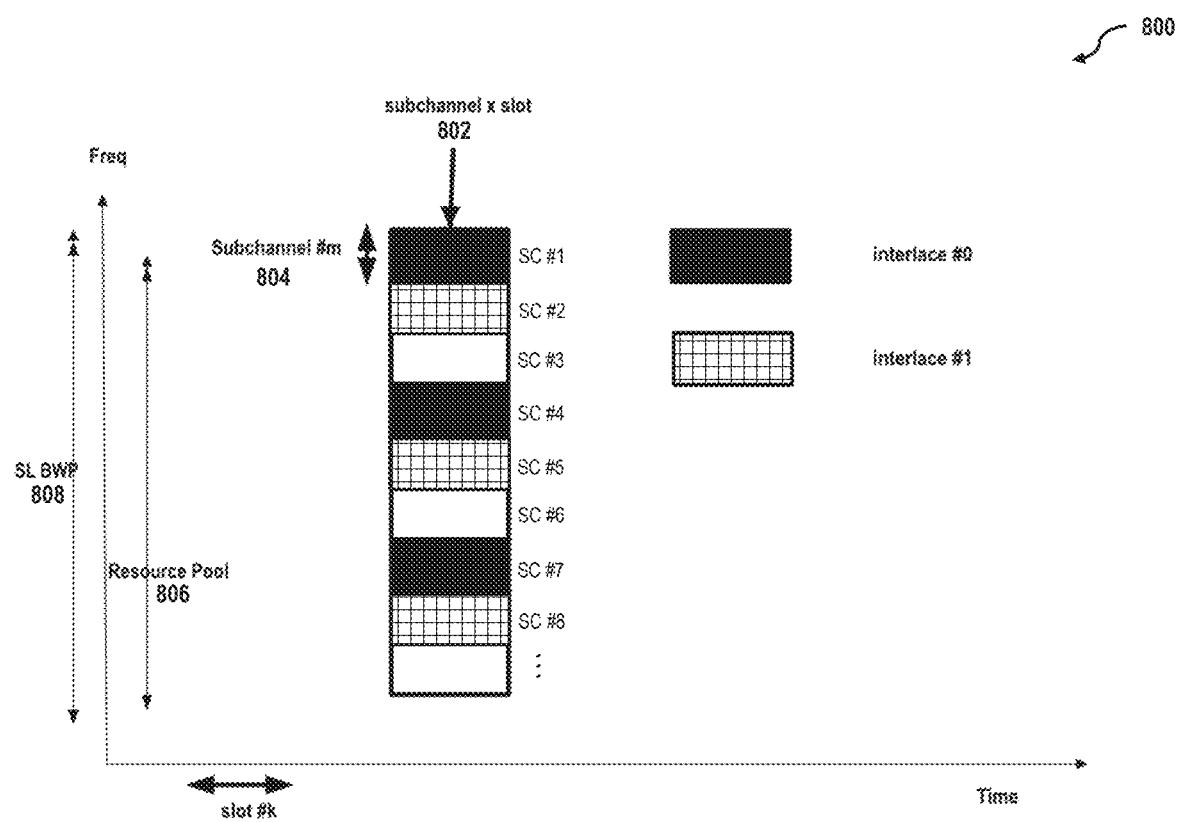
FIG. 8 is a graphical illustration depicting an exemplary subchannel-level interlacing scheme.

FIG. 8 is a graphical illustration depicting an exemplary subchannel-level interlacing scheme 800. In the exemplary embodiment depicted in FIG. 8, interlacing is executed at subchannel granularity for a sidelink slot 802 including a series of subchannels 804 in a sidelink resource pool 806 configured in a sidelink BWP 808. More particularly, in this example, subchannels 804 may be interlaced according to interlacing scheme 800 as subchannel #1, subchannel #k+1, subchannel #2k+1, . . . subchannel #pk+1, where K represents a number of interlaces supported in sidelink resource pool 806 or sidelink BWP 808.

In exemplary operation, when implemented in an unlicensed spectrum such as NR-U, scheme 800 may further utilize an interlaced physical channel transmission. For example, as illustrated in FIG. 8, a first physical channel may be transmitted with respect to interlace #0 (e.g., PRBs of the interlace #0) and a second physical channel may be transmitted with respect to interlace #1 (e.g., PRBs of the interlace #1) to achieve subchannel-level interlacing. Accordingly, in an exemplary embodiment, a wireless device may be configured to schedule a sidelink control and/or data according to this interlacing example of scheme 800, such that interlace #0 will include subchannel #1, subchannel #4, and subchannel #7, etc., whereas interlace #1 will include subchannel #2, subchannel #5, and subchannel #8, etc.

In an exemplary embodiment, the wireless device may select one or more interlaces when the wireless device transmits the sidelink control/data. In some embodiments of scheme 800, it may be desirable to increase signaling overhead to allow a relatively small number of PRBs to be used for the sidelink transmission.

Figure 9:
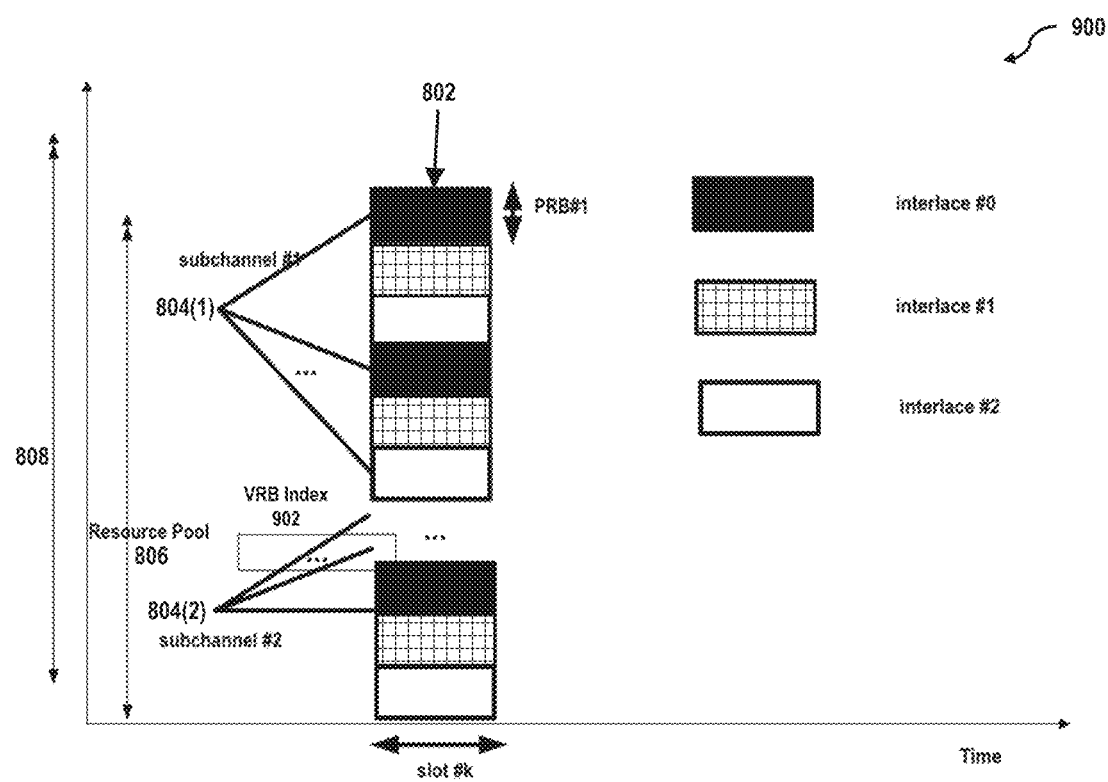
FIG. 9 is a graphical illustration depicting an exemplary redefined subchannel according to the interlacing scheme depicted in FIG. 8.

FIG. 9 is a graphical illustration depicting an exemplary redefined subchannel 900 according to interlacing scheme 800, FIG. 8. More particularly, through implementation of interlacing scheme 800, subchannel 900 may be advantageously redefined according to the following principles. In an embodiment, subchannel redefinition may begin with the definition of interlaced resource blocks. For example, each resource block (PRB) may belong to one of multiple interfaces (e.g., interlace m∈{0,1, . . . , M−1}), where m may be determined based on a PRB index of the PRB in common resource blocks (e.g., a resource block index based on a reference point A). Further to this example, multiple interlaces of resource blocks may then be defined according to interlace m∈{0,1, . . . , M−1} including common resource blocks {m, M+m, 2M+m, 3M+m, . . . }, with M being the number of interlaces (e.g., obtained from by Table 1, below, indicating number of resource block interlaces M for an index μ).

TABLE 1

| μ | M |
|---|---|
| 0 | 10 |
| 1 | 5 |

Accordingly, a relation between the interlaced resource block $n_{IRB,m}^{\mu} \in \{0,1,\ldots\}$ in a BWP i, an interlace m, and a common resource block $n_{CRB}^{\mu}$ may be represented according to:

$$n_{CRB}^{\mu} = Mn_{IRB,m}^{\mu} + N_{BWP,i}^{start,\mu} + ((m - N_{BWP,i}^{start,\mu}) \bmod M) \quad (Eq.\ 1)$$

where $N_{BWP,i}^{start,\mu}$ is the common resource block where the BWP starts relative to common resource block 0. When there is no risk for confusion the index μ may then be dropped. In an embodiment, a UE may expect that the number of common resource blocks in an interlace contained within the BWP i is no less than 10.

In an exemplary embodiment, configuration parameters of a sidelink resource pool may include, without limitation, one or more of: (1) a starting PRB index of the sidelink resource pool; (2) an enabled interlace parameter; and (3) a subchannel size. Similar to the techniques described above, one or more of these exemplary sidelink pool configuration parameters may be configured by a base station or a wireless device, or may alternatively be pre-configured.

In an embodiment, the starting PRB index of the sidelink resource pool may be configured such that a first wireless device may determine a starting interlace index $m \in \{0,1,\ldots,M-1\}$ based on the starting PRB index if interlace is enabled. For example, m may be determined as the starting PRB index mod as a percentage or remainder divided by M, and the starting PRB index may thus be a PRB index in a common resource block. In some instances, in the case where the starting PRB index (e.g., sl-StartRB-Subchannel) indicates a lowest RB index of a subchannel with a lowest index in the sidelink resource pool with respect to a lowest RB index of a sidelink BWP (e.g., where the sidelink BWP includes the sidelink resource pool), the wireless device may determine a second starting PRB index, of a common resource block, based on the starting PRB index and a point A (e.g., a reference point of the sidelink BWP). In this case, the wireless device may be further configured to compute an offset as {starting frequency of the sidelink BWP–point A}/P, where P is a frequency size of a PRB (or RB). The second starting PRB index may then be the starting PRB index+the offset.

With respect to the enabled interlace parameter EnabledInterlace, in the case where this parameter is present and set to '1' (or '0'), the first wireless device may be configured to determine that interlacing is enabled for the sidelink resource pool. The first wireless device may then further determine the starting interlace index m according to the principles described herein.

With respect to the subchannel size parameter, the subchannel size may be considered in terms of a number of RBs. For example, a subchannel having a lowest index in the sidelink resource pool may include one or more of (i) a first RB with the starting PRB index in the sidelink BWP, (ii) a second RB with an index equal to the starting PRB index+M, (iii) a third RB with a second index equal to the starting PRB index+2*M, and (iv) up to a k–1$^{th}$ RB having a k–1$^{th}$ index equal to the starting PRB index+(k–1)*M. Further to this example, a second subchannel having a next lowest index in the sidelink resource pool may include a first RB with a first index equal to the starting PRB index+k*M if the first index is within the resource pool, or, if not within the resource pool, the first index equal to the starting PRB index+1. According to these exemplary embodiments, and as described further below with respect to FIG. 10, a virtual RB index 902 may be configured within the sidelink resource pool, and which may increase from the RB with the starting PRB and the starting interlace index, then increase in the frequency domain based on the interlace index (e.g., next interlace index equal to (the starting interlace index+1)mod M)).

Figure 10:
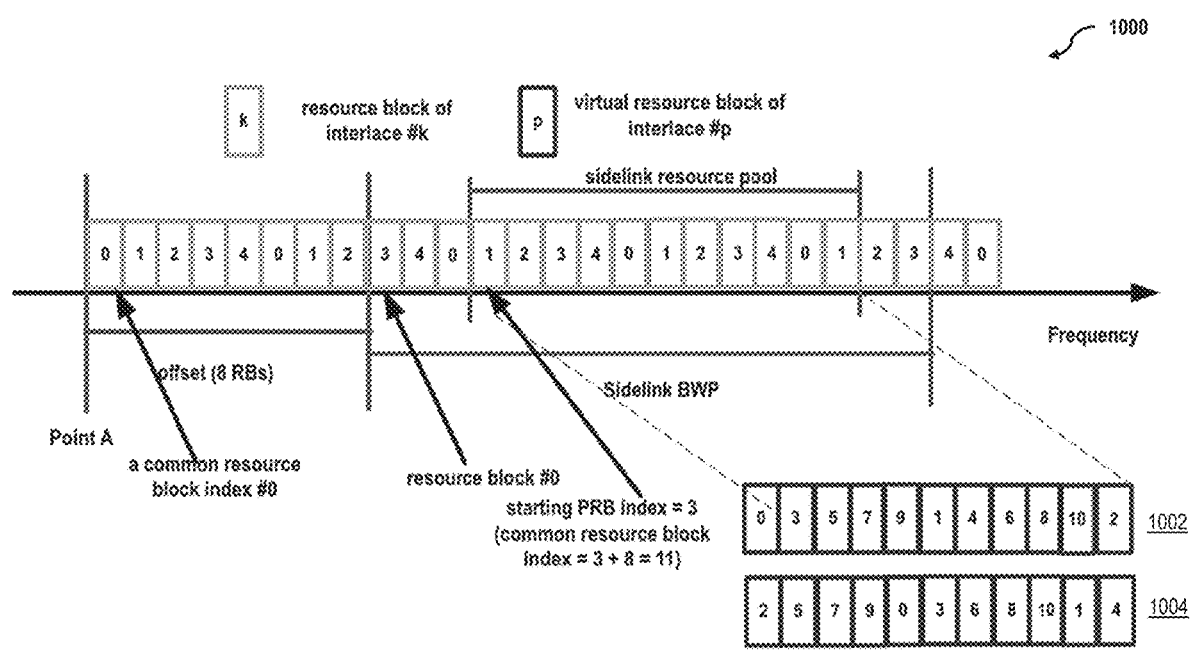
FIG. 10 is a graphical illustration depicting an exemplary virtual resource block index according to the interlacing scheme depicted in FIG. 8.

FIG. 10 is a graphical illustration depicting an exemplary virtual resource block (VRB) index 1000 according to interlacing scheme 800, FIG. 8. In an exemplary embodiment, VRB index 1000 is similar to VRB index 902, FIG. 9, and may be advantageously implemented to determine different interleaving-based VRB indexing results according to a first indexing approach 1002 wore a second indexing approach 1004.

According to first indexing approach 1002, a first virtual resource block (the RB) having a lowest index (e.g., resource block index 0) may start from a starting RB of a sidelink resource pool. The resulting VRB index therefrom may increase in the frequency domain initially using the same interlace index, but then (e.g., in the case of no further RBs with a same interlace index) increase an interlace index by 1 and then move to a lowest RB with the increased interlace index in the sidelink resource pool. In an exemplary implementation of first indexing approach 1002, a starting interlace index is 1, and the next interlace index would then be 2 in this example. In the case where the next interlace index exceeds M–1 (i.e., the total number of interlaces), a modulo M may be performed. Thus, for this example, after reaching interlace index 4, the next interlace index becomes 0.

Alternatively, according to second indexing approach 1004, a first PRB in a sidelink resource block having a lowest index of a lowest interlace index (e.g., a lowest indexed RB with a interlace index=0 in a sidelink resource pool) may be assigned with a lowest VRB index. The resulting VRB index may then increase in the frequency domain and then the interlace index. The person of ordinary skill in the art will understand that two VRB indexing approaches are described herein by way of example, and not in a limiting sense. Different or additional VRB indexing approaches may be implemented without departing from the scope herein.

With respect to either VRB indexing approach 1002, 1004, after achieving the virtual resource block indexing, the subchannel may be advantageously reconsidered to constitute a subchannel size P of virtual resource blocks/VRBs in consecutive indexes. For example, a subchannel with index=0 may now be indexed to include VRBs with an index 0, 1, . . . , P–1, and a subchannel with index=1 may be indexed to include VRBs with an index P, P+1, . . . 2P–1, etc.

Thus, in the case where first indexing approach 1002 is implemented, a subchannel with index 0 may include PRBs with index=11 (VRB index 0), PRBs with index=16 (VRB index 1), where P=2. In a similar manner, a subchannel with index 1 may include PRBs with index=21 (VRB index 2), and PRBs with index=12 (VRB index 3). In contrast, in the case where second indexing approach 1004 is implemented (again, where P=2), a subchannel with index 0 may include PRBs with index=15, index=20, index=11. Through such innovative physical-to-virtual RB indexing conversions, advantageous interlacing techniques may be implemented at the subchannel level without having to substitute the subchannel itself entirely with the interlace. Through these new techniques, an improved subchannel redesign may be effectively achieved.

The exemplary systems and methods described herein therefore effectively demonstrate real solutions for the recent sidelink enhancement WI proposed by the RAN4 Report #95 (RP-220300) for sidelink operation in the unlicensed spectrum. The solutions demonstrated with respect to the present embodiments may also be implemented in full compliance with existing regulatory requirements and industry standards. As described above, several of the solutions provided herein directly improve upon present industry standards for the relevant technologies.

Exemplary embodiments of systems and methods for COT sharing and subchannel-level interlacing are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of initiating a sidelink operation between a first wireless electronic device and a second wireless electronic device in an unlicensed spectrum, comprising the steps of:
   receiving, at the first wireless device, one or more first configuration parameters of a sidelink bandwidth part (BWP) for the sidelink operation, wherein the one or more first configuration parameters include at least one channel occupancy time (COT) signal for a first COT sharing;
   obtaining, after the step of receiving, one or more second configuration parameters for a transmission sidelink resource pool, wherein the one or more second configuration parameters include at least one priority value for the first COT sharing;
   determining (i) a first sidelink transmission of the sidelink operation from the one or more first configuration parameters, and (ii) a first priority level of the first sidelink transmission from the one or more second configuration parameters;
   decoding a first sidelink control information (SCI) to indicate an offset value and a first COT duration for the first COT sharing; and
   transmitting the first sidelink transmission and the first SCI to the second wireless electronic device.

2. The method of claim 1, wherein the one or more first configuration parameters include the COT sharing, the transmission sidelink resource pool, and a reception sidelink resource pool.

3. The method of claim 1, wherein the at least one priority value for the first COT sharing includes a priority threshold for the COT sharing.

4. The method of claim 1, wherein, in the step of determining, the first COT sharing is based on the first sidelink transmission and the first priority level.

5. A method of sharing a channel occupancy time (COT) between a first wireless electronic device and a second wireless electronic device, comprising the steps of:
   receiving, by the first wireless electronic device from the second wireless electronic device at a first time, a first sidelink control information (SCI) including (i) a first COT sharing, and (ii) a first priority value of a channel access;
   determining (i) a second priority value of the channel access for a sidelink transmission, and (ii) at least one sidelink resource for a sidelink transmission;
   calculating a first channel access type based on the first COT sharing, the first time, the first priority value, and the second priority value;
   executing the first channel access type; and
   transmitting the sidelink transmission and the first SCI based on a successful execution of the first channel access type.

6. A method of selecting a listen-before-talk (LBT) category for a wireless electronic device, comprising the steps of:
   receiving, by the wireless electronic device, (i) a first sidelink control information (SCI) indicating a sharing of channel occupancy time (COT) having a first time domain resource, and (ii) a second SCI indicating a sidelink feedback mode and a destination identity;

determining, from the second SCI (i) a receiving sidelink shared channel scheduled by the second SCI, and (ii) a sidelink feedback scheduling based on the sidelink feedback mode;

selecting at least one of a first LBT type and a second LBT type based on (i) the sidelink feedback scheduling, (ii) the sharing of the COT, (iii) a second time domain resource overlapping with the first time domain resource of the COT, and (iv) a feedback resource for a sidelink feedback of the sidelink feedback mode; and transmitting the sidelink feedback based on the selected LBT type.

7. The method of claim 6, wherein the first SCI and the second SCI are the same.

8. The method of claim 6, wherein the first SCI is different from the second SCI.

9. The method of claim 6, wherein the COT indicates at least one frequency domain resource.

10. The method of claim 9, wherein the step of selecting is further based on an overlapping of the at least one frequency domain resource of the COT and the feedback resource for the sidelink feedback.

11. A method of configuring, by a wireless electronic device, one or more subchannels of a communication channel for interlacing, comprising the steps of:

receiving, by the wireless electronic device, configuration parameters of a sidelink operation in an unlicensed spectrum, the configuration parameters including (i) a starting frequency point of a common resource block (RB) determined to have a lowest index among one or more RBs of a first subchannel of the one or more subchannels, (ii) an enabling interlaced transmission parameter configured to enable determination of a resource for a sidelink transmission based on one or more interlace RBs, (iii) a starting RB index of the first subchannel determined to have a lowest RB index within a resource pool, (iv) a size of the first subchannel within the resource pool, and (v) a number of subchannels within the resource pool;

determining a first set of RBs for the first subchannel based on (i) the enabling interlaced transmission parameter, (ii) the starting frequency point, and (iii) the size of the first subchannel; and transmitting a sidelink transmission using resources based on the determined first set of RBs for the first subchannel, wherein the sidelink transmission includes a sidelink control information (SCI) indicating the first subchannel.

12. The method of claim 11, wherein the step of determining the first set of RBs is further based on the number of the subchannels within the resource pool and the starting RB index parameter.

13. The method of claim 11, further comprising a step of determining a second set of RBs for a second subchannel determined to have a lowest subchannel index within the resource pool.

14. The method of claim 13, wherein the second set of RBs includes a first RB including the starting RB index and at least one second RB having a first interlace index.

15. The method of claim 14, wherein the first RB includes the first interlace index.

16. The method of claim 13, wherein the second set of RBs includes one or more RBs determined to have a lowest interlace index among the second set of RBs.

17. The method of claim 11, wherein the lowest subchannel index has a value of 0 or 1.

18. The method of claim 11, wherein the one or more RBs of the first subchannel are physical RBs (PRBs).

19. The method of claim 18, wherein the determined first set of RBs include virtual RBs (VRBs).

20. The method of claim 11, further comprising a step of reconstituting the first subchannel such that the size of the first subchannel includes a plurality virtual RBs (VRBs) in consecutive indexes.

* * * * *